United States Patent [19]

Green

[11] Patent Number: 4,769,765

[45] Date of Patent: Sep. 6, 1988

[54] CONTROLLED ACCESS PROGRAMMABLE EVENT TIMER SYSTEM

[76] Inventor: David L. Green, 18340 Cutlass Dr., Ft. Myers Beach, Fla. 33931

[21] Appl. No.: 928,781

[22] Filed: Nov. 10, 1986

[51] Int. Cl.$^4$ .................. G06F 15/20; G04B 47/00
[52] U.S. Cl. .................. 364/145; 235/382; 364/401; 364/569; 368/10; 340/825.34
[58] Field of Search .......... 364/143, 144, 145, 569, 364/401; 340/309.15, 825.3, 825.31, 825.34; 235/380, 382, 382.5; 368/10; 315/360

[56] References Cited

U.S. PATENT DOCUMENTS

| | | | |
|---|---|---|---|
| 4,228,543 | 10/1980 | Jackson | 340/309.15 X |
| 4,279,012 | 7/1981 | Beckedorff et al. | 364/145 |
| 4,455,093 | 6/1984 | Bowen et al. | 368/10 |
| 4,521,843 | 6/1985 | Pezzolo et al. | 364/569 X |
| 4,624,578 | 11/1986 | Green | 368/10 |
| 4,700,296 | 10/1987 | Palmer, Jr. et al. | 368/10 X |

*Primary Examiner*—Joseph Ruggiero
*Attorney, Agent, or Firm*—Charles J. Prescott; Raymond H. Quist

[57] ABSTRACT

A control system is disclosed which can be attached to equipment such as appliances or automobiles, or built in as a part thereof. The control system includes an enabling/disabling device such as a relay in a circuit in the equipment. A time setting device is used to program a microprocessor with the times when the relay will open and close—thereby disabling and enabling the equipment. The time setting device can only be used to set the times by a person having an authentic authorization device such as a card or a key. The card is read by a card reader and the information obtained is compared by the microprocessor with the authentic information. In the case where a key is the authorization device, it is used to close a circuit to the microprocessor. A liquid crystal display is provided to display time information, and a rechargeable battery is included to prevent changing the time by unplugging the equipment.

14 Claims, 1 Drawing Sheet

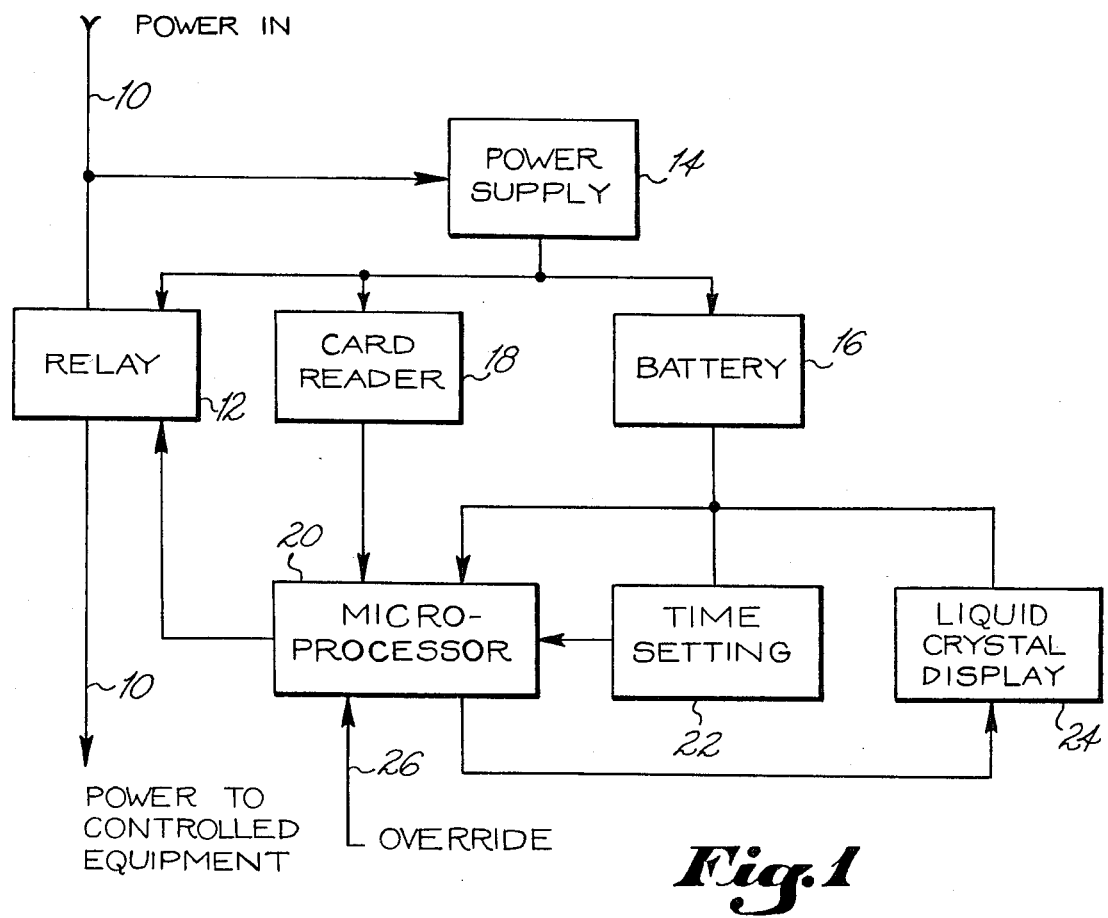
Fig.1
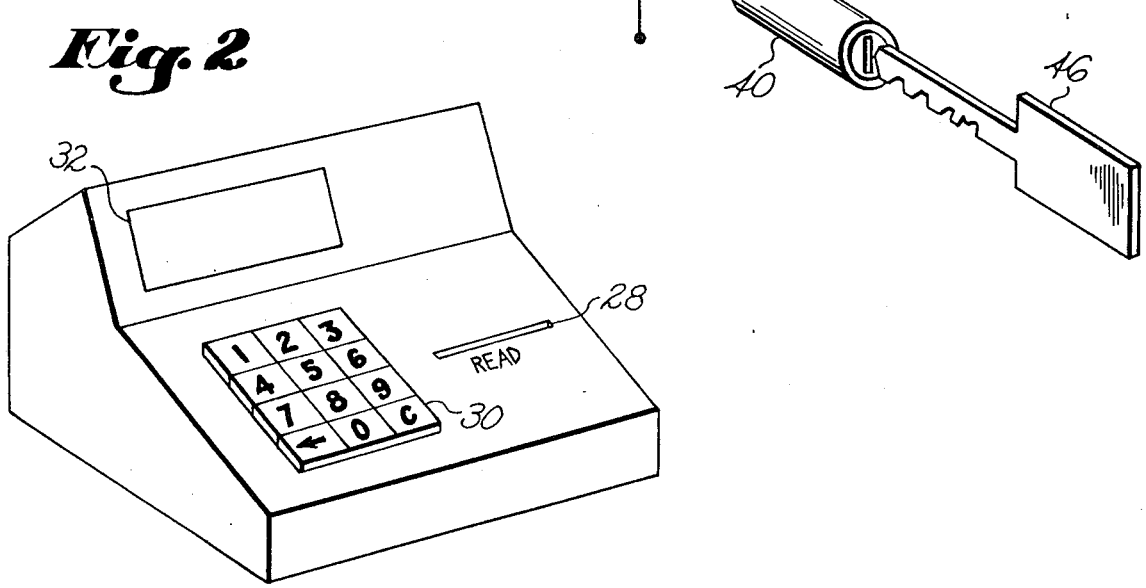
Fig.2
Fig.3

CONTROLLED ACCESS PROGRAMMABLE EVENT TIMER SYSTEM

BACKGROUND OF THE INVENTION

1. Field of the Invention

This invention relates generally to a system which permits use of equipment only during particular times, and more particularly to a system in which the times may be defined only by a person having an authorization device which is recognized by a control system on the equipment.

2. Description of Related Art

The owner of equipment which may be used in his absence, often wishes to control the period of time during which the equipment may be used. For example, to prevent the viewing of objectionable late night television channels by young children. The owner may also wish to have his equipment provided with a disabling device so as to discourage theft of the equipment because it can't be used without having the enabling means.

In the past, a number of timers have been built which allow the operation of equipment for a short period of time, usually a few minutes or hours. However, some of these timers can be reset by an unauthorized person when the time has expired either because no arrangement is provided to prevent this, or because the protective arrangement can be readily thwarted. Other timers require the return of the equipment to the owner to have it enabled for additional time; a requirement which is onerous with some equipment.

U.S. Pat. No. 4,455,093, Bowen et al., entitled: "Timer Mechanism for Rental Equipment", discloses a mechanical timer mounted on rental equipment which limits the time that the rental equipment can be used. A key, retained by the owner, is used to reset the timer, so that the equipment must be returned to the owner in order to get additional time for using the equipment.

U.S. Pat. No. 4,521,843, Pezzolo et al., entitled: "Programmable Wall Switch for Controlling Lighting Times and Loads", discloses an electronic timer which is used to turn a light on or off at times which may be selected. No means for preventing unauthorized resetting of the timer is provided.

U.S. patent application Ser. No. 06/803,218, filed 12/02/85 U.S. Pat. No. 4,624,578, D. Green, entitled: "Rental Contract Timer System", discloses a system where a timer and enabling/disabling equipment are installed on rental equipment. The timer is set by having a card with a magnetic strip encoded with time information. This card is purchased from the renter of the equipment, is read by a decoder on the equipment and is erased at the time it is read.

It is therefore an object of this invention to provide a control system for equipment which requires a properly encoded authorization card in order to use the equipment.

It is also an object of this invention to provide a control system in which an authorized person can set the times during which the equipment can be operated in his absence.

In accordance with these and other objects, which will become apparent hereafter, the instant invention will now be described with reference to the accompanying drawings.

BRIEF DESCRIPTION OF THE DRAWINGS

FIG. 1 is an electric schematic block diagram showing a preferred embodiment of the invention;

FIG. 2 is a perspective view of the external components of FIG. 1 in a suitable housing; and FIG. 3 is a perspective view of a modified form of a portion of FIG. 1.

SUMMARY OF THE INVENTION

This invention is a control system for permitting control of the times of operation of equipment. Only a person having a key or a card containing the correct authorization code may set the times that the equipment may be operated. The equipment includes a card reader for producing signals represented by the code, a time setting device for entering times during which the equipment may be used, a display for exhibiting time information and a microprocessor performing several functions. An enabling/disabling device, which typically is a relay, is controlled by the microprocessor in accordance with authorized directions. Where the control system is used with equipment where abrupt termination of use is not practical, such as an automobile, an override may be provided to permit normal termination.

DETAILED DESCRIPTION OF THE INVENTION

The equipment with which the control system is primarily intended to be used will normally have some type of critical electrical circuit, such as the power circuit, in which a relay, or the like, can be used as an enabling/disabling device. Referring to FIG. 1, line 10 represents such a power circuit which typically is located within the cabinet of the equipment in some location where putting jumper wires would be difficult. Relay 12 is positioned in line 10 so that opening relay 12 will disconnect the power to the equipment, and closing relay 12 will reconnect power line 10. Thus relay 12 is one type of enabling/disabling device. Many alternate enabling/disabling devices are used in equipment, frequently operated by a key.

Power supply 14 derives its input power from line 10, which typically carries 110 volts alternating current and delivers five volts of direct current to the system components as shown. Thus, the 110 volt power for the equipment will be controlled by relay 12 having a solenoid which operates on the five volt dc current.

In order that the control of equipment usage which is intended to be vested only in an authorized person or persons will not be readily defeated, battery 16 is included in the circuit to provide power for the control system even when the power supply to line 10 is interrupted, such as by disconnecting the plug. Battery 16 is preferably the rechargeable type.

Card reader 18 is used to "read" the card possessed by the authorized person. This card may be of the type which has a magnetic stripe which has a digital number or other code encoded therein. Such magnetically encoded cards may be preferred because the code is not readily apparent, nor is the card readily reproduced without special equipment. A magnetic stripe card reader commercially available is the SRD Inc. as MCR-175. An alternate card may be the type using a bar code so that card reader 18 would be an optical type.

Card reader 18 delivers signals representative of the code on the card to microprocessor 20. Microprocessor 20 compares the information received from card reader 18 with the information contained in its Read Only Memory. If a match is not made, no entries which are attempted will be effective. If a match is made, timing switches 22 can be manipulated to designate times during which the equipment may be operated. This operation of the equipment is performed using its conventional controls.

The timing information entered using time setting 22 is delivered to the Random Access Memory of microprocessor 20. Microprocessor 20 drives liquid crystal display 24 which displays current time, and, if desired, times during which the equipment may be used. A liquid crystal display suitable for this purpose is available from Seiko and is identified as M 1632. A microprocessor which may be used is available from Motorola and is identified as MC 68705U3. This one chip microprocessor is a versatile device containing a central processing unit, input and output ports for interfacing and timing circuits as well as the ROM and RAM. Input 26 to microprocessor 20, labeled "override" in FIG. 1, is provided for use when the equipment must continue operation until normal termination—regardless of the programmed disable time. As referred to above, such a use would be with an automobile.

Card reader 18, timing switches 22 and liquid crystal display 24 are needed to be available outside the cabinet or the like of the equipment in which the other system components would normally be located. FIG. 2 illustrates a cabinet arrangement for these components having slot 28 for inserting the card to be read, keyboard 30 for entering the time and liquid crystal display 32.

Although the previous structure with a card reader and an associated card is a preferred embodiment, an analogous arrangement can be achieved by substituting for card reader 18 of FIG. 1, the arrangement shown in FIG. 3. FIG. 3 shows lock 40 which is connected to operate electric switch 42 by rotating shaft 44. Lock 40 can only be turned by using the proper key 46. When switch 42 is closed by using key 46, an electrical connection is made from power supply 14 to microprocessor 20 which serves as an authorized code signal. When this authorized code signal is received by microprocessor 20, time setting device 22 can be set as described above.

The control system may be installed by the original equipment manufacturer at the time the equipment is produced, or may be added to existing equipment. The relay or other enabling/disabling device may be effective, even in an exposed position, for certain purposes, e.g. preventing use of office equipment after business hours by unauthorized personal. To be effective against a thief, the disabling device would preferably be incorporated within the equipment housing.

In use, an authorized person would insert the card containing the authentic code into the card reader. Time information would then be entered using the time setting device. The card would then be kept in a safe place until new time information is to be entered.

While the instant invention has been shown and described herein in what is conceived to be the most practical and preferred embodiment, it is recognized that departures may be made therefrom within the scope of the invention, which is therefore not to be limited to the details disclosed herein, but is to be afforded the full scope of the claims so as to embrace any and all equivalent apparatus and articles.

I claim:

1. A control system connectable to equipment for permitting the operation of the equipment only during times specified by an authorized person comprising:
    enabling/disabling means connected to the equipment controlling operability of the equipment;
    timer means connected to said enabling/disabling means for causing said enabling/disabling means to assume enable and disable positions at one or more designated times;
    said timer means including time digit entry means for setting said designated times for operation and stopping of operation of the equipment; and
    said timer means including a card reader for producing signals representing an authorization authentication code for preventing operation of said time setting means except by an authorized person.

2. A control system in accordance with claim 1 wherein:
    said timer means includes a microprocessor connected to receive inputs from said card reader and said time setting means; and
    said microprocessor is connected to said enabling/disabling means to provide signals directing said enabling/disabling means to assume enable and disable positions.

3. A control system in accordance with claim 2 further including:
    display means for displaying time information connected to receive said time information from said microprocessor.

4. A control system in accordance with claim 3 further including:
    a battery connected to supply power to said microprocessor, said time digit entry means and said display means.

5. A control system in accordance with claim 2 further including:
    an override command input to said microprocessor to prevent disabling at the designated stopping time.

6. A control system in accordance with claim 3 further including:
    a housing containing said card reader, said time digit entry means and said display means.

7. A control system in accordance with claim 3 wherein:
    said display means is a liquid crystal display.

8. A control system connectable to equipment for permitting the operation of the equipment, which equipment includes a critical electric circuit, only during times specified by an authorized person as determined by an encoded card comprising:
    a relay connected to open and close the critical electric circuit;
    a microprocessor connected to said relay to cause said relay to open and close;
    a time digit entry setting device connected to said microprocessor to deliver to said microprocessor times for opening and closing said relay;
    card reader means for producing signals representing information encoded on a card;
    said card reader means connected to said microprocessor to deliver to said microprocessor information encoded on a card;
    said microprocessor being programmed to compare said card information from said card reader to an authentic authorized code and to accept time setting only when an authentic authorized code is contained on the card.

9. A control system in accordance with claim 8 further including:
   display means connected to said microprocessor for displaying time information.

10. A control system in accordance with claim 9 further including:
   a battery connected to provide power to said microprocessor, said display means and said time digit entry setting device.

11. A control system in accordance with claim 10 further including:
   an override command input to said microprocessor to prevent opening of said relay at the time set for opening said relay.

12. A control system connectable to equipment for permitting the operation of the equipment which includes an 110 volt alternating current power line only during times specified by an authorized person as determined by an encoded card comprising:
   a relay connected to open and close the power line in the equipment;
   a microprocessor connected to said relay to cause said relay to open and close;
   a time setting device having a keyboard for entering time digits connected to said microprocessor to deliver to said microprocessor times for opening and closing said relay;
   a card reader connected to said microprocessor to deliver to said microprocessor information encoded on cards read by said card reader;
   a liquid crystal display connected to said microprocessor receiving and displaying time information from said microprocessor;
   a rechargeable battery connected to supply power to said microprocessor, said time setting device and said liquid crystal display;
   a power supply connected to the power line to receive alternating current;
   said power supply providing direct current to said relay, said card reader and said battery; and
   said microprocessor being programmed to compare said card information from said card reader to an authentic authorized code and to accept time setting information only when an authentic authorized code is contained on the card.

13. A control system in accordance with claim 12 further including:
   an overriding input connected to said microprocessor.

14. A control system in accordance with claim 12 further including:
   a housing containing said card reader, said time setting device and said liquid crystal display.

* * * * *